(12) United States Patent
Pericevic et al.

(10) Patent No.: US 8,944,221 B2
(45) Date of Patent: Feb. 3, 2015

(54) DISK BRAKE FOR A COMMERCIAL VEHICLE

(75) Inventors: Aleksandar Pericevic, Munich (DE); Stephan Pitzing, Munich (DE); Johann Baumgartner, Moosburg (DE); Steffen Geissler, Hallbergmoos (DE); Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 837 days.

(21) Appl. No.: 12/498,110

(22) Filed: Jul. 6, 2009

(65) Prior Publication Data
US 2010/0000828 A1 Jan. 7, 2010

Related U.S. Application Data

(63) Continuation of application No. PCT/EP2007/064600, filed on Dec. 28, 2007.

(30) Foreign Application Priority Data

Jan. 5, 2007 (DE) .......................... 10 2007 001 213

(51) Int. Cl.
*F16D 65/14* (2006.01)
*F16D 55/2265* (2006.01)
(Continued)

(52) U.S. Cl.
CPC .......... *F16D 55/22655* (2013.01); *F16D 65/54* (2013.01); *F16D 2127/02* (2013.01)
USPC ........................... 188/73.44; 188/67; 188/71.8

(58) Field of Classification Search
USPC ................ 188/71.7, 71.8, 72.9, 73.43, 73.44, 188/73.45, 43.31, 67, 68, 196 P, 73.31
See application file for complete search history.

(56) References Cited

U.S. PATENT DOCUMENTS 3,688,876 A * 9/1972 Akiyoshi Hirai et al. . 188/73.45
4,458,790 A * 7/1984 Hoffman et al. ............. 188/71.8
(Continued)

FOREIGN PATENT DOCUMENTS

DE 12 11 448 2/1966
DE 19 48 866 4/1970
(Continued)

OTHER PUBLICATIONS

German Office Action dated Nov. 9, 2007 including English translation (Eight (8) pages).
(Continued)

*Primary Examiner* — Melody Burch
(74) *Attorney, Agent, or Firm* — Crowell & Moring LLP

(57) ABSTRACT

A disc brake, particularly for a commercial vehicle, includes a brake caliper configured as a sliding caliper, two brake pads, which are disposed in the brake caliper, at least one guide spar for fastening the brake caliper to a stationary carrier, a brake application device, effective via at least one adjusting spindle, an adjusting device, which is non-rotatably connected to the adjusting spindle, for compensating brake pad wear, and a restoring device, disposed on the action side and having a restoring element that is elastically deformable if the brake caliper is displaced as a function of the braking operation and by which the caliper can be automatically brought into a starting position. The disc brake is configured such that the restoring device has a supporting part, which remains in position relative to the brake anchor plate if the brake caliper is displaced as a function of the braking operation, and which interacts with the resilient restoring element.

16 Claims, 9 Drawing Sheets

(51) Int. Cl.
*F16D 65/54* (2006.01)
*F16D 65/00* (2006.01)
*F16D 127/02* (2012.01)

(56) References Cited

U.S. PATENT DOCUMENTS

| | | | | |
|---|---|---|---|---|
| 4,488,622 | A | * 12/1984 | Stoka | 188/72.3 |
| 4,715,479 | A | * 12/1987 | Buckley | 188/71.8 |
| 4,781,273 | A | * 11/1988 | Fujinami | 188/73.42 |
| 4,887,696 | A | * 12/1989 | Redenbarger et al. | 188/73.45 |
| 5,439,084 | A | 8/1995 | Vila Boluda | |
| 5,647,459 | A | 7/1997 | Buckley et al. | |
| 6,135,245 | A | 10/2000 | Kurasako et al. | |
| 7,721,854 | B1 | * 5/2010 | Mackiewicz | 188/73.44 |
| 2009/0260928 | A1 | * 10/2009 | Baumgartner et al. | 188/73.44 |

FOREIGN PATENT DOCUMENTS

| | | |
|---|---|---|
| DE | 25 21 871 C2 | 11/1976 |
| DE | 30 29 472 C2 | 3/1982 |
| DE | 31 48 133 A1 | 6/1983 |
| DE | 35 10 372 A1 | 9/1986 |
| DE | 198 37 446 A1 | 3/1999 |
| DE | 197 45 775 A1 | 5/1999 |
| DE | 198 53 439 A1 | 6/2000 |
| DE | 199 46 677 A1 | 5/2001 |
| EP | 0 645 551 A1 | 3/1995 |
| FR | 2807485 A1 * | 10/2001 |
| GB | 2 112 480 A | 7/1983 |
| GB | 2 202 287 A | 9/1988 |
| GB | 2 345 104 A | 6/2000 |
| JP | 8-232995 A | 9/1996 |
| JP | 2004-308805 A | 11/2004 |
| WO | WO 01/36838 A1 | 5/2001 |

OTHER PUBLICATIONS

International Search Report dated Jun. 11, 2008 including English translation (Six (6) pages).

* cited by examiner

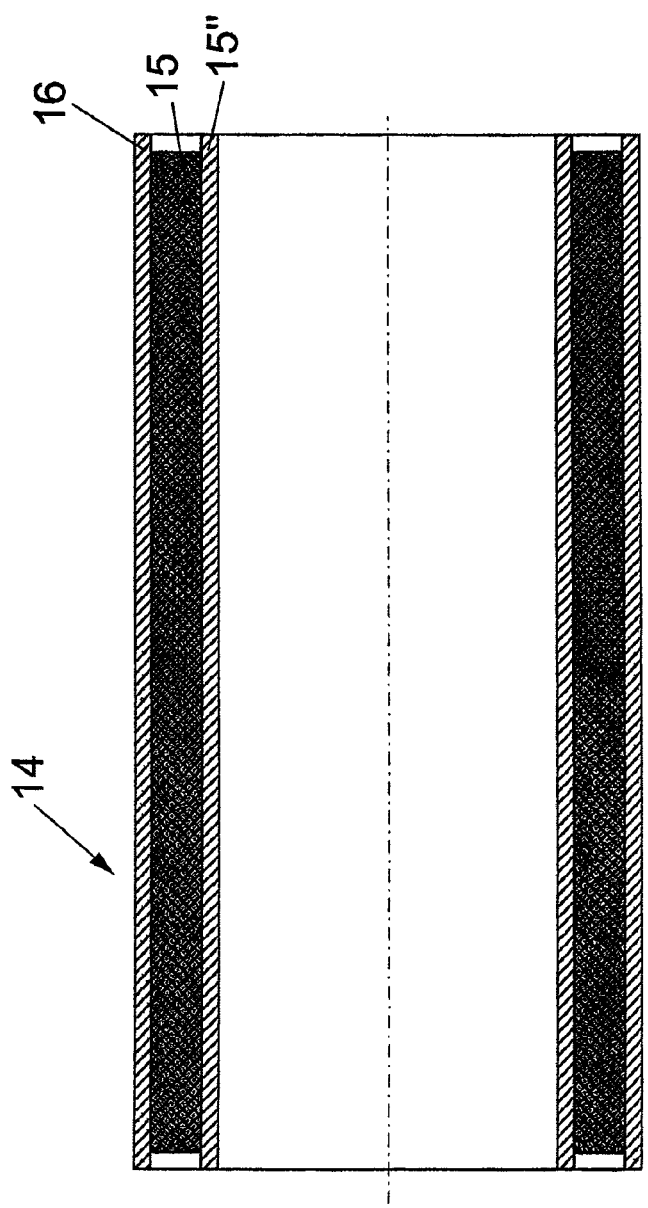

DISK BRAKE FOR A COMMERCIAL VEHICLE

CROSS-REFERENCE TO RELATED APPLICATIONS

This application is a continuation of PCT International Application No. PCT/EP2007/064600, filed Dec. 28, 2007, which claims priority under 35 U.S.C. §119 to German Patent Application No. DE 10 2007 001 213.8, filed Jan. 5, 2007, the entire disclosures of which are herein expressly incorporated by reference.

BACKGROUND AND SUMMARY OF THE INVENTION

The invention relates to a disc brake, in particular for a commercial vehicle.

In the functional case, that is to say in the case of a braking operation, the brake pads are applied by way of a brake application device first of all by the application-side brake pad being pressed against the brake disc and by the opposite, reaction-side brake pad subsequently being pressed. The brake caliper, which is configured as a sliding caliper, is displaced for this purpose counter to the application direction of the application-side brake pad.

After the brake is released, the brake caliper remains in this last-mentioned position in the case of the known sliding caliper disc brake, in which position the brake pads or at least the reaction-side brake pad bears against the brake disc in a pressureless but grinding manner. What are known as the "residual grinding moments", which occur as a result during driving operation, lead to an increased fuel consumption of the vehicle and to a reduction in the service life both of the brake disc and the brake pads.

A slight release of the brake pads takes place during driving operation as a result of the movement of the brake disc and as a result of jolts and transverse accelerations when driving around bends. However, these effects are not sufficient to prevent the grinding effectively.

In order to avoid these disadvantages, DE 199 46 677 A1 has disclosed a disc brake in which a restoring device has a supporting part, which is mounted in the brake caliper and is guided slidingly on a guide spar of a fastening element, which is connected fixedly to the brake carrier and acts together with the supporting part as a sliding bearing.

If the brake caliper is displaced for pressing the reaction-side brake pad, the supporting part is pressed against an elastic restoring element which is configured as a compression spring and is intended to return the brake caliper into an initial position after the brake is released.

For wear-induced compensation of the air play, which compensation takes place on the application side by way of an adjusting device, the supporting part is mounted in a friction sleeve, which bears against the supporting part with static friction. Here, the coefficient of friction between the supporting part and the friction sleeve is selected in such a way that the friction sleeve adheres to the supporting part during normal braking operation, while it slides correspondingly on the supporting part, in a manner which overcomes the friction, during adjustment of the brake caliper by the adjusting device, until the adjusting stroke is reached.

However, the restoring of the brake caliper is exclusively dependent on the spring travel of the restoring element which is configured as a compression spring, which, however, does not make exact restoring possible to an always identical air play dimension between the brake disc and the reaction-side brake pad, with the result that the known brake disc represents a rather unsatisfactory solution of the problem.

The invention is therefore based on the object of developing a disc brake such that constant restoring of the brake caliper in relation to the air play is ensured.

This and other objects are achieved by a disc brake, particularly for a commercial vehicle, having: a) a brake caliper which straddles a brake disc and is configured as a sliding caliper; b) two brake pads, which are arranged in the brake caliper, can be moved in opposite directions and make contact with the brake disc in the functional position; c) at least one fastening element, which has a guide spar for fastening the brake caliper to a stationary brake carrier; d) a brake application device, by way of which the associated action-side brake pad can be pressed against the brake disc via at least one adjusting spindle; e) an adjusting device, which is connected in a rotationally locked manner on the adjusting spindle and by way of which a wear-induced change in an air play between the brake pads and the brake disc can be substantially compensated for; and f) a restoring device, which is arranged on the action side and has a restoring element which can be deformed elastically during the braking-induced displacement of the brake caliper, by way of which restoring device the brake caliper can be brought automatically into an initial position counter to the displacement direction during the brake application, wherein the restoring device has a supporting part, which remains in its position with respect to the brake carrier during the braking-induced displacement of the brake caliper and is operatively connected to the resilient restoring element with deformation of the latter.

In comparison with the prior art, in which the bush which forms a supporting part and is mounted on the guide spar slides on the guide spar during the braking-induced displacement of the brake caliper and is pressed against a resilient restoring element, the supporting part remains held on the guide spar, unchanged in its position, during the braking-induced displacement.

To this end, the supporting part is configured such that it bears with static friction against the guide spar, which is dimensioned such that the displacement force which is active during braking is not sufficient to overcome the static friction.

A greater force which displaces the supporting part on the guide spar by the adjusting stroke is active only when the adjusting device is actuated, by way of which adjusting device a wear stroke of the brake pads is compensated for.

As a result of the position of the supporting part which otherwise remains with respect to the guide spar, the resilient restoring element is deformed by the amount of the air play and, in the case of relief, that is to say when the braking operation is ended, is reset into its original position by exactly this amount, which corresponds to the air play, with driving of the brake caliper, that is to say with it being displaced counter to the application direction.

The supporting part and the restoring element can be, for example, configured in one piece, the supporting part being configured from a concentric bush, which surrounds the guide spar, and a plurality of lips which are arranged parallel to and at a spacing from one another, enclose the bush as rings, consist of an elastic, that is to say resilient material, and are incidentally deformed in their axial direction during the braking-induced displacement of the brake caliper with respect to the bush. When the braking operation ends, the lips which are incidentally connected fixedly to the brake caliper restore the brake caliper into its initial position on account of the inherent restoring forces, in accordance with the predefined air play.

According to a further aspect of the invention, the supporting part includes a static ring which bears against the guide spar with static friction and preferably fits into a circumferential inner groove of a receiving sleeve, on an end side of which the resilient restoring element is supported, which can be configured as a helical spring mounted directly or indirectly on the guide spar such that it can be displaced axially.

Instead of a static ring of this type in combination with the receiving sleeve which together form the supporting part, the supporting part can also include at least one clamping ring, preferably a packing of clamping rings which bear against the guide spar under prestress and therefore with the generation of static friction. Here, the restoring element in the form of the helical spring is also supported on the end side on a clamping ring, while the other end side of the helical spring bears against a shoulder of the brake caliper.

Clamping rings of this type are known as commercially available components and have, in each case, a continuous longitudinal slot for generating the prestress.

In the case of a braking-induced displacement of the brake caliper, the helical spring is compressed correspondingly, which helical spring bears at the other end directly against the brake caliper or against a part which is connected rigidly to the brake caliper. The spring force to be overcome is lower here than the holding force which is generated by the static friction of the supporting part. The result is that the brake caliper slides on the receiving sleeve which receives the static ring or on the clamping rings. The static friction of the supporting part is overcome and this is forwarded correspondingly, until the extent of the wear stroke is reached, only in the case of a greater force which acts on the helical spring and an associated increase in the spring force, as results during the wear-induced adjustment of the brake caliper.

Two fastening elements are usually provided in a disc brake, by way of which fastening elements the brake caliper is held on the brake carrier such that it can be displaced axially in the direction of the brake disc. Here, one connecting region is configured as a locating bearing and the other connecting region is configured as a floating bearing, in each case as sliding bearings, however.

Since the locating bearing requires, as a result of its function, a relatively large amount of installation space, above all a relatively large overall length, this region is suitable for placing the restoring device. In a supplementary manner, in the case of unfavorable installation conditions and a high restoring force requirement, a restoring device can additionally be used in the floating bearing.

In this case, the required restoring force and the clamping force of the supporting parts, that is to say their static friction on the guide spar, are divided over both restoring devices. The restoring force is expediently higher at the locating bearing than at the floating bearing. It can be sufficient here to equip the restoring device of the floating bearing with an elastomer ring which is provided with the circumferential elastic lips, while the locating bearing is to be provided with one or more clamping rings.

The embodiment in which the supporting part includes a packing of clamping rings can be realized in two different possible designs. In a first variant, the maximum possible moving force of the restoring element, that is to say of the restoring spring, is lower than the minimum possible adjusting force of the adjusting device. Here, in the case of adjusting operations, the brake caliper is pulled onto the brake disc with the reaction-side brake pad, counter to the force of the restoring spring. The entire air play is then on the action side and is set there as overall air play. To this extent, this is identical to disc brakes without an active caliper restoring device.

After the air play is set or after a braking operation has taken place, the restoring device resets the brake caliper by the predefined amount and thus generates the air play on the reaction side. The overall air play is thus set exclusively by the adjusting device. The division of the overall air play to the action (inner) side and reaction side (outer side) is determined by the caliper restoring means.

EXAMPLE

The overall air play is set to 0.9 mm by the adjusting device;
the restoring device resets by 0.4 mm;
air play on the reaction side=0.4 mm;
air play on the action side=0.9 mm−0.4 mm=0.5 mm.

In a second variant, the minimum possible force of the restoring element is greater than the maximum possible adjusting force of the adjusting device. Here, during a wear adjustment, the brake caliper is not placed against the brake disc with the outer brake pad, since the adjusting force of the adjusting device is lower than the restoring force of the resilient restoring element. Here, the wear adjustment takes place only on the action side of the brake; that is to say, the air play to be set there is only approximately half the overall air play.

The air play is set on the outer side by the brake caliper also being pulled onto the brake disc on the outer side (reaction side) during the brake actuation which follows the adjusting operation. After the brake actuation, the restoring device resets the brake caliper by the preset amount and thus generates the air play on the outer side.

If, during a braking operation, a displacement of the supporting part has occurred as a consequence of the wear which has occurred on the reaction side, this displacement leads, after the restoring of the brake caliper, to an increase in the air play on the action side, where it is corrected again during the next adjusting operations.

Example

Before a braking operation:
air play on the action side=0.5 mm
air play on the reaction side=0.4 mm.
Braking operation with 0.05 mm wear per side:
Supporting part is displaced by 0.05 mm.
After the release of the brake:
Air play on the action side=0.5+0.05+0.05=0.6 mm
Air play on the reaction side=0.4 mm.
During following air play settings by the adjusting device, the air play increase is compensated for again on the action side.

While the first variant is particularly suitable, in particular, for what is known as normal operation of commercial vehicles on account of the low necessary restoring forces of the restoring element, the second variant exhibits particular advantages in commercial vehicles which are used during rough operation, for example as construction vehicles.

Further advantageous embodiments of the invention are described herein.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 9 and 10 show in each case further exemplary embodiments as details which are shown in longitudinal section.

DETAILED DESCRIPTION OF THE DRAWINGS

Figure 1:
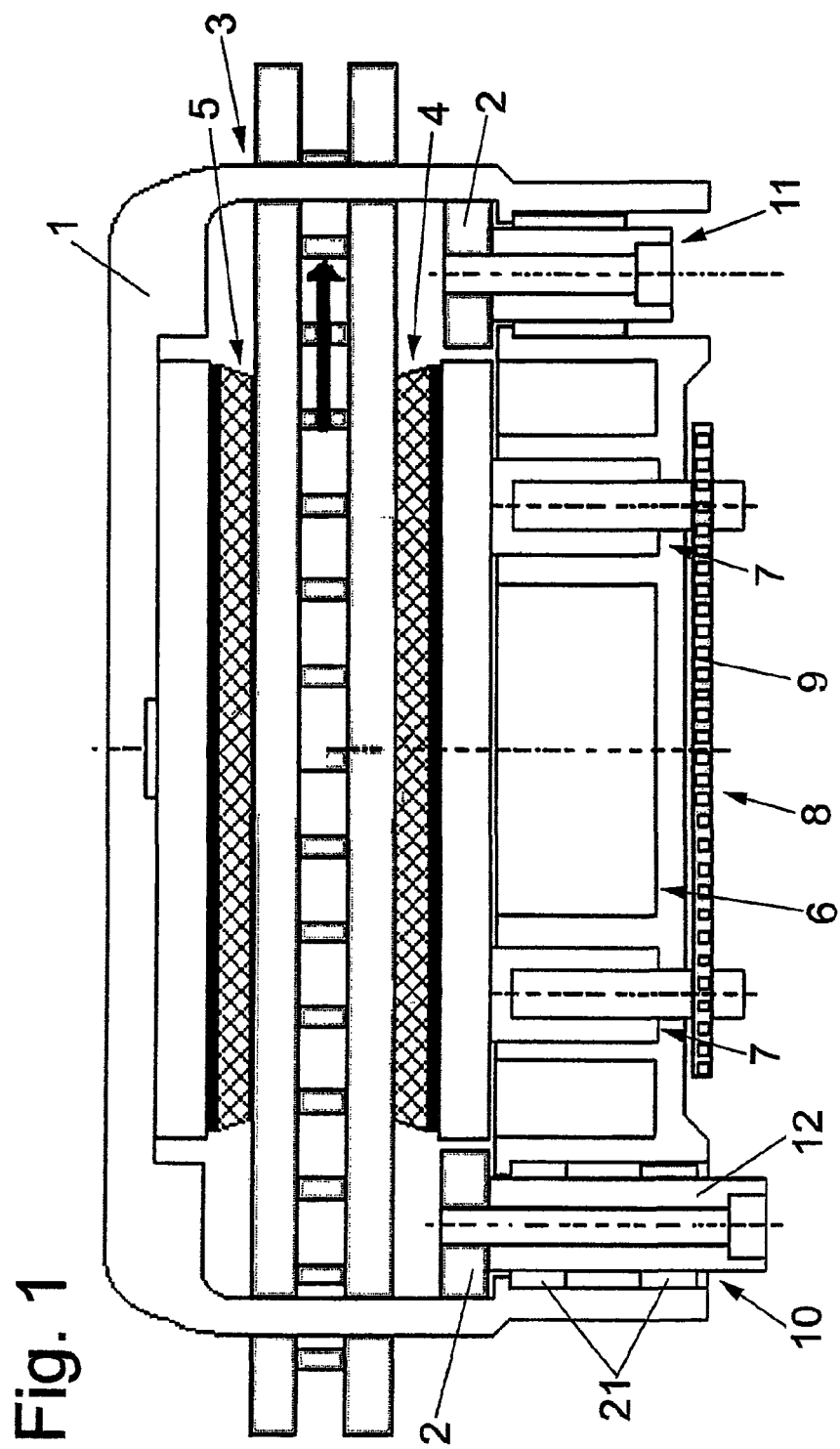
FIG. 1 shows a plan view of a disc brake in a diagrammatic illustration.

The disc brake shown in FIG. 1 for a commercial vehicle includes, in its basic construction, a brake caliper 1 which straddles over a brake disc 3 and in which two brake pads 4, 5 are arranged. The brake pads make contact with the brake disc 3 on both sides in operation of the disc brake.

The brake caliper 1 is fastened via two fastening elements to a brake carrier 2 on the vehicle side, a fastening element on the outlet side according to the arrow direction being configured as a floating bearing 11, and the opposite fastening element on the inlet side being configured as a locating bearing 10.

Here, the locating bearing 10 has a guide spar 12, which is fixed to the brake carrier 2 and on which sliding sleeves 21 (FIG. 2) are mounted. The sleeves 21 can be displaced axially in the direction of the brake disc 3 and are secured axially in the brake caliper. A brake application device acts on a bridge 6 and has two adjusting spindles 7 (as shown here), via which the connected brake pad 4 can be pressed against the brake disc 3.

One of the two adjusting spindles 7 has an adjusting device 8, by which a wear-induced change in an air play between the brake pad 4 and the brake disc 3 can substantially be compensated for. A transmission element, for example in the form of a chain 9, by which the two adjusting spindles 7 can be rotated at the same time, is provided for a synchronous actuation of the adjusting spindles 7.

In the case of a braking operation, first of all the application-side brake pad 4 is pressed against the brake disc 3, while subsequently, on account of the reaction forces which are produced, the brake caliper 1 which is configured as a sliding caliper is guided in the opposite direction to the application direction, with the reaction-side brake pad 5 being driven along with it, and the brake pad 5 is pressed against the brake disc 3.

In order to restore the brake caliper 1 during release of the brake, that is to say to guide the brake caliper 1 back into its initial position, a restoring device 13 is provided on the action side, that is to say on the application side, preferably in the region of the locating bearing 10. By way of the restoring device 13, the brake caliper 1 can be moved automatically into the initial position, counter to the displacement direction during brake application.

The restoring device 13 has a supporting part 15, which remains in its position with respect to the brake carrier 2 during the braking-induced displacement of the brake caliper 1. The supporting part is operatively connected to the resiliently configured restoring element 14 with deformation of the restoring element 14.

Figure 2:
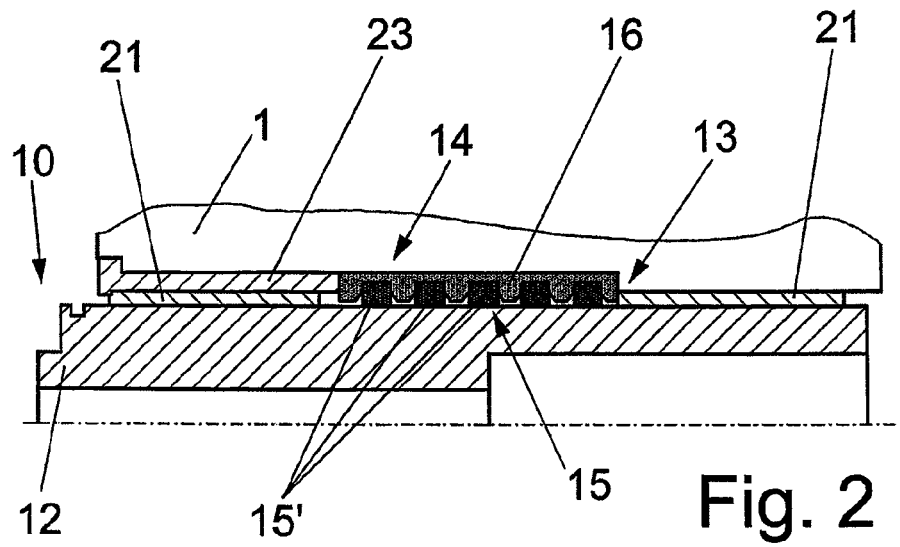
FIGS. 2 and 3 show one exemplary embodiment of the invention, in each case as a detail shown in longitudinal section in different functional positions.
Figure 3:
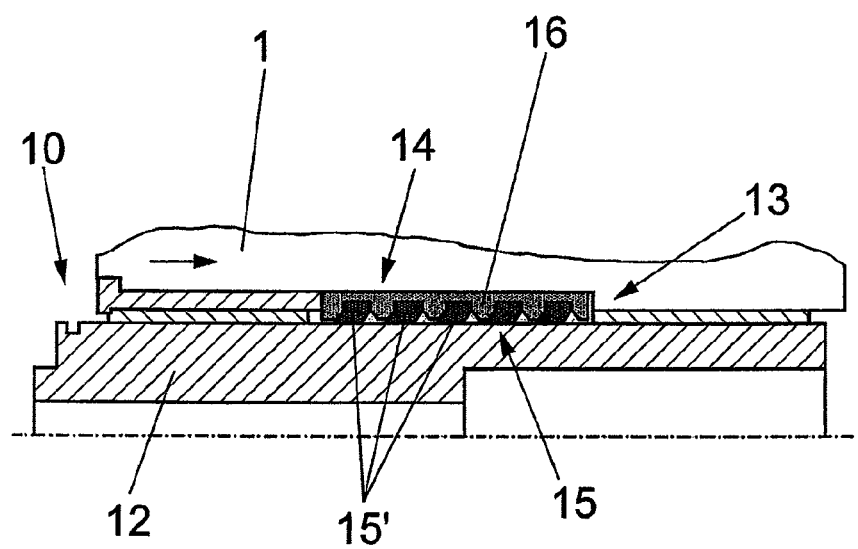

In the exemplary embodiment shown in FIGS. 2 and 3, the supporting part 15 is formed from a plurality of supporting lips 15', which are arranged parallel to and at a spacing from one another. The lips 15' engage around the guide spar 12, are composed of an elastic material, and are held on the guide spar 12 by static friction such that their position with respect to the guide spar 12 does not change in the case of deformation as a result of the displacement of the brake caliper 1 during braking.

While FIG. 2 depicts an unloaded position of the supporting parts 15', FIG. 3 shows an application position of the brake caliper 1. Here, the supporting lips 15' are deformed correspondingly on the head side, to be precise in the direction of the arrow in FIG. 3.

After the braking operation is ended, the brake caliper 1 is guided back into an initial position, as is clear in FIG. 2, on account of the restoring forces which are present in the supporting lips 15'. Here, firstly the coefficient of static friction between the supporting lips 15' and the guide spar 12 and secondly the jointly acting restoring forces of the supporting lips 15' are configured in such a way that, in the case of a normal braking operation, the supporting lips 15' remain in their position, while, after the braking operation is ended, the brake caliper is guided back into a position in which the predefined air play is reestablished between the reaction-side brake pad 5, which is connected to the brake caliper 1, and the brake disc 3.

The coefficient of friction between the supporting lips 15' and the guide spar 12 is selected such that, in the case of a wear-induced adjustment by way of the adjusting device 8, in which the brake caliper 1 overcomes the wear-induced greater air play by corresponding displacement of the brake caliper 1, the supporting lips 15' slide along on the guide spar 12 by the corresponding amount, until said wear stroke is compensated for. Afterward, restoring takes place again by the supporting lips 15' regaining their shape by the amount of the predefined air play.

A driver 16 is fastened to the brake caliper 1 for a connection between the supporting lips 15' and the brake caliper 1. The driver 16 has circumferential grooves which lie on the outside and into which, in each case, one annular supporting lip 15' is inserted. The annular grooves are configured such that a deflection of the supporting lips 15' is readily possible, in accordance with the illustration in FIG. 3.

Figure 4:
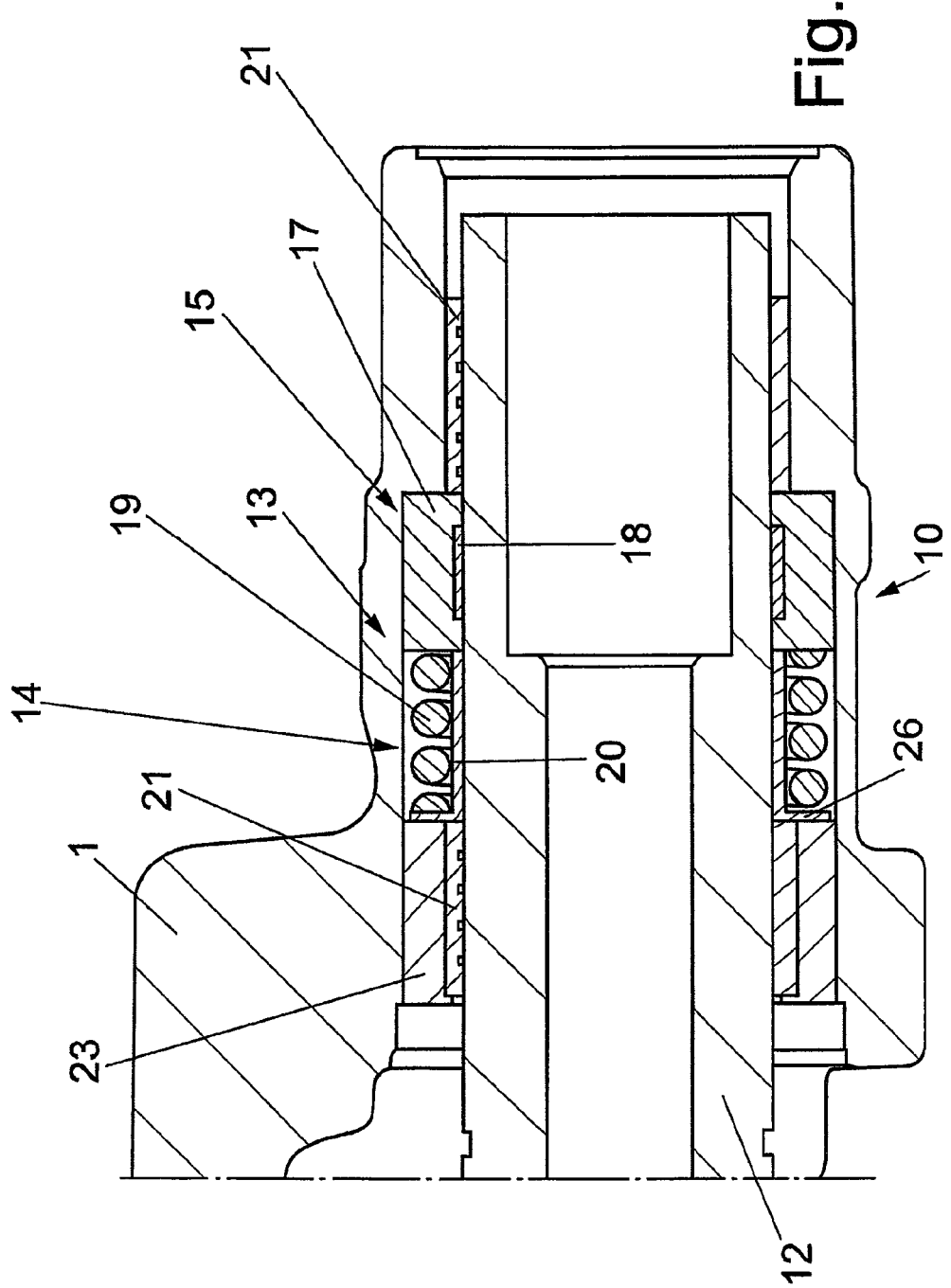
FIGS. 4 and 5 show in each case further exemplary embodiments, likewise shown as a detail in longitudinal section.
Figure 5:
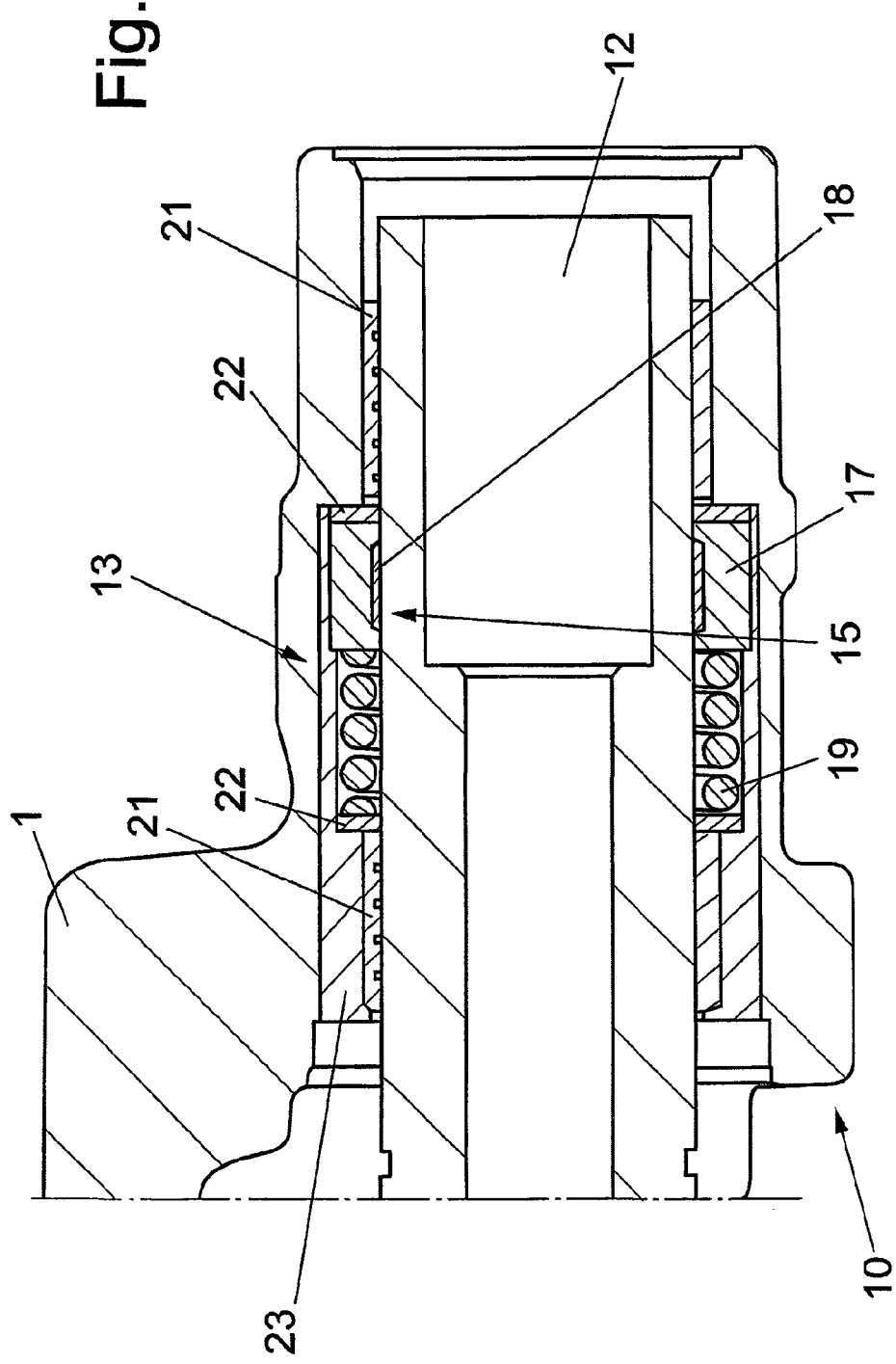
Figure 6:
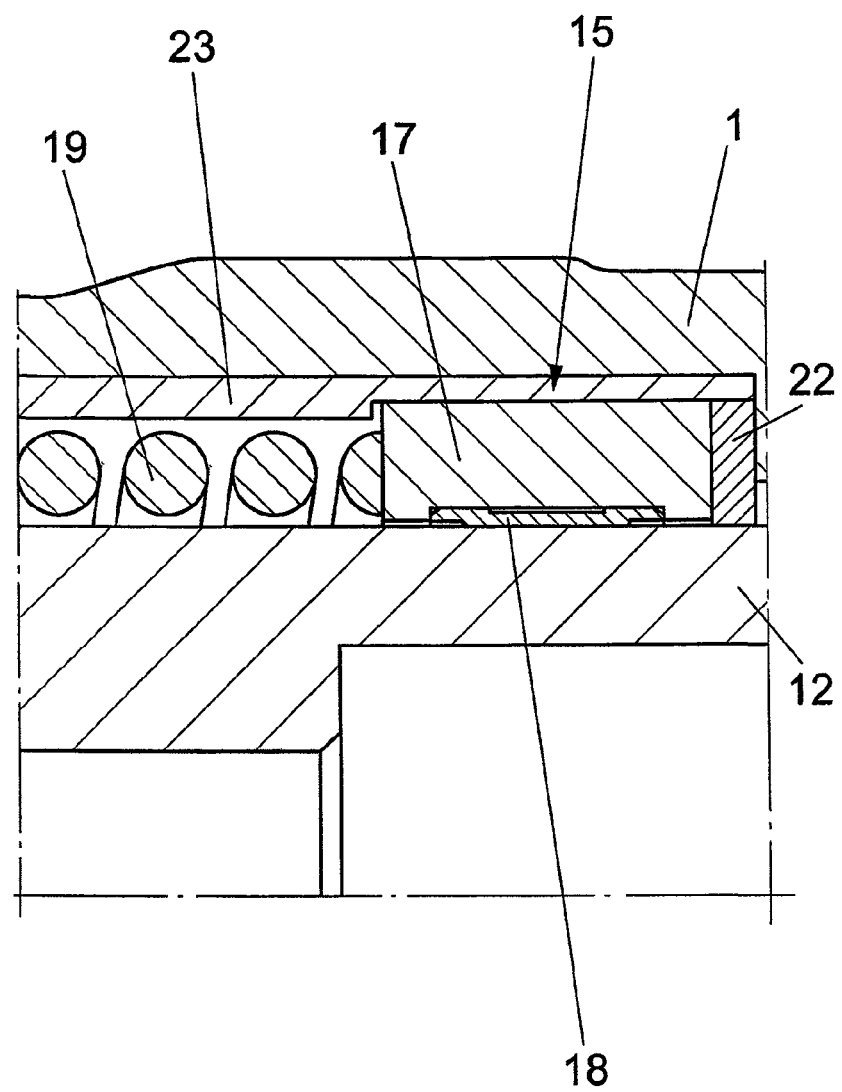
FIG. 6 shows an enlarged part section of the example which is shown in FIG. 5.

In the exemplary embodiments shown in FIGS. 4 and 5, the supporting part 15 includes, in each case, a receiving sleeve 17 which reaches around the guide spar 12 on the outside. The receiving sleeve 17 has an inner groove, in which a static ring 18 is fitted in an axially secured manner and which bears against the guide spar 12 with static friction. FIG. 6 is an enlarged view of the supporting part 15.

In the form of a helical spring 19, which is guided concentrically on the guide spar 12, the restoring element 14 bears against an end side of the receiving sleeve 17, to be precise on the end side which faces the brake disc.

In the variant embodiment according to FIG. 4, the helical spring 19 lies on the outer circumferential surface of a stop sleeve 20, which is mounted axially displaceably on the guide spar 12, just like an associated sliding sleeve 21 which is fastened to a bearing sleeve 23 of the brake caliper 1 and finds its counterpart on the opposite side, which is adjacent to the receiving sleeve 17.

The coefficient of friction between the static ring 18 and the guide spar 12 is comparable with that described, for example, in accordance with FIGS. 2 and 3.

In the case of a braking-induced displacement of the brake caliper 1, the helical spring 19 is compressed by a collar 26 of the stop sleeve 20, against which the helical spring 19 bears on its side which lies opposite the receiving sleeve 17, until the stop sleeve 20 (previously arranged at a spacing from the receiving sleeve 17) bears against the receiving sleeve 17. The spacing between the associated end side of the stop sleeve 20 and the receiving sleeve 17 corresponds to the predefined air play between the reaction-side brake pad 5 and the brake disc 3.

After the brake is released, the helical spring 19 is relieved with displacement of the brake caliper 1 counter to its application direction in the case of a braking operation. Since the spacing of the stop sleeve 20 from the receiving sleeve 17 corresponds to the desired air play in the nonfunctional position of the brake, that is to say in the relieved position of the helical spring 19, exactly this air play is performed by the restoring action of the brake caliper 1 by use of the helical spring 19. Here, in the relieved end position, the brake caliper 1 comes into contact with the receiving sleeve 17, to which end the brake caliper has a stepped bore, into which the stop sleeve 17 with the integrated static ring 18, the restoring element 14, and the bearing sleeve 23 are inserted.

In the example which is shown in FIG. 5, for premounting parts to form a structural unit, supporting rings 22 are provided, of which one is supported on that end side of the receiving sleeve 17 which faces away from the helical spring 19 and the other is supported on the opposite end side of the helical spring 19. The supporting rings 22 are inserted into the bearing sleeve 23 and are connected fixedly to the latter. The thickness of the supporting rings 22 corresponds to the air play.

Simple mounting is possible as a result of the premounting option of the restoring device 13, including the bearing sleeve 23, the bearing sleeve 21 which lies facing the brake disc 3, the supporting rings 22, the helical spring 19 which are enclosed between them, and the receiving sleeve 17 with an integrated static ring 18. The bearing sleeve 23 practically forms an outer casing, which is preferably pressed or adhesively bonded to the brake caliper 1.

In the case of a wear-induced adjustment, the receiving sleeve 17 and the static ring 18 (which is fitted in it) are displaced on the guide spar 12 in the manner previously described, with the static friction of the static ring 18 being overcome, until the wear stroke is compensated for and the brake caliper is guided back by the amount of the air play which is to be maintained.

Figure 7:
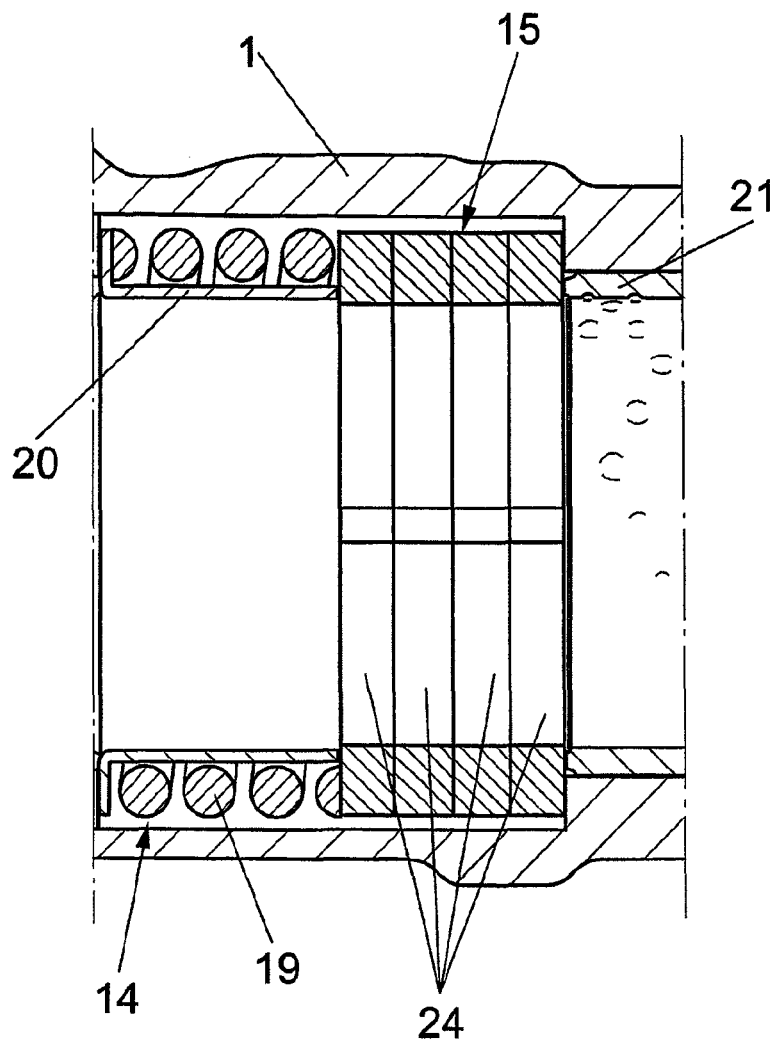
FIG. 7 shows a part section of a further exemplary embodiment, likewise in a longitudinal section.
Figure 8:
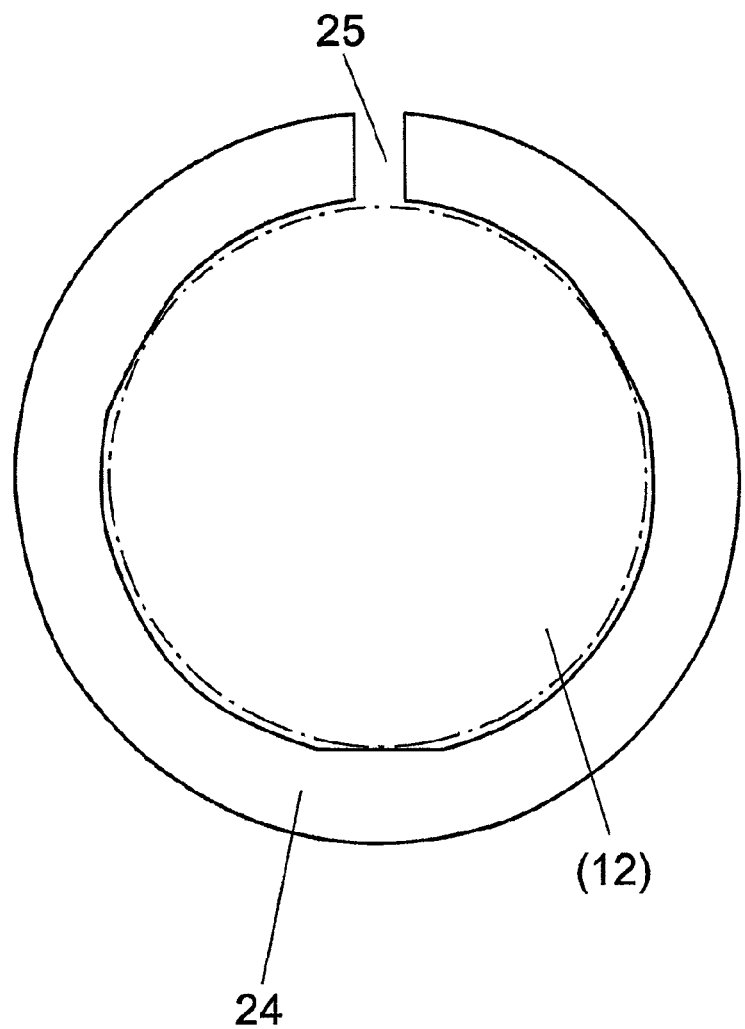
FIG. 8 shows a detail of FIG. 7 in a front view.

Finally, FIGS. 7 and 8 show a further embodiment of the supporting part 15, in which it includes a plurality of clamping rings 24, which are packed together and are held on the guide spar under prestress. The prestress is achieved by a corresponding shape of the clamping rings 24, in a comparable manner to the static friction of the above-described supporting parts 15, as can be seen very clearly in FIG. 8. Here, each clamping ring 24 can be formed from a spring plate, having a longitudinal slot 25, by which the active spring force is generated on the guide spar 12.

Figure 9:
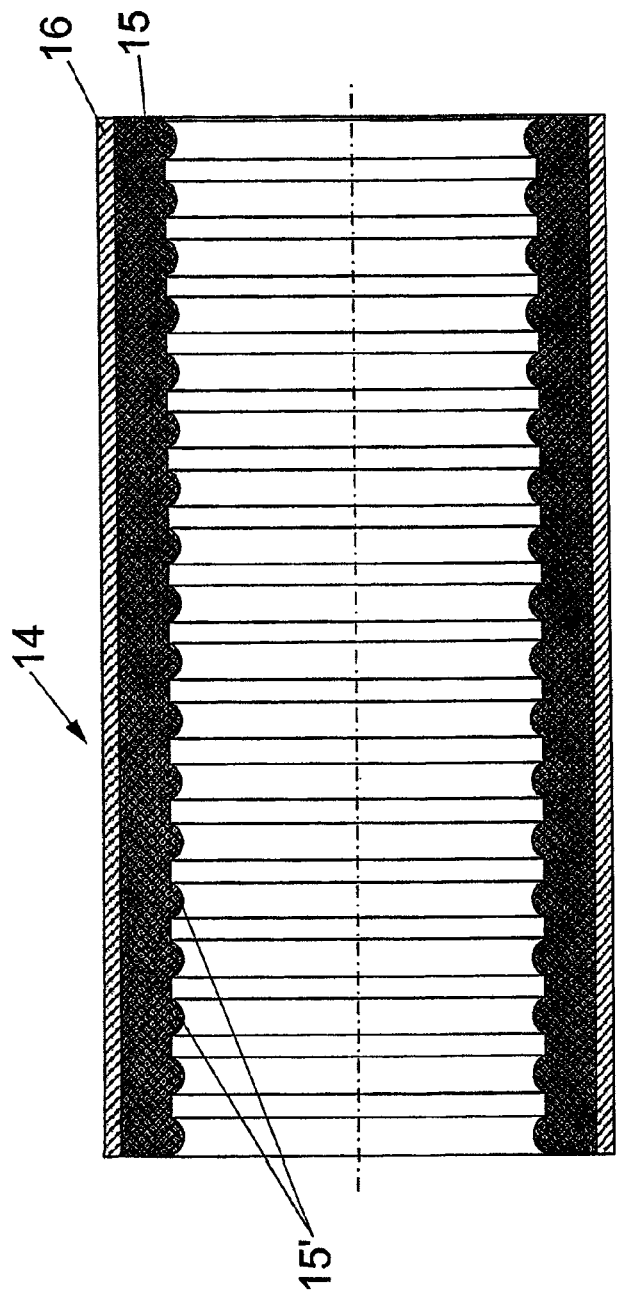

FIGS. 9 and 10 show, in each case, a further exemplary embodiment of a restoring element 14, the exemplary embodiment which is shown in FIG. 9 in principle corresponding to that of FIGS. 2 and 3. Here, however, the supporting lips 15' are an integral constituent part of the supporting part 15, which is encapsulated by a metal sleeve which forms the driver 16.

It can be seen in FIG. 10 that the supporting part 15 is lined on the inside by a preferably slotted inner sleeve 15", which bears against the guide spar 12 in the context of the invention.

TABLE OF REFERENCE NUMBERS

1 Brake caliper
2 Brake carrier
3 Brake disc
4 Brake pad
5 Brake pad
6 Bridge
7 Adjusting spindle
8 Adjusting device
9 Chain
10 Locating bearing
11 Floating bearing
12 Guide spar
13 Restoring device
14 Restoring element
15 Supporting part
15' Supporting lips
15" Inner sleeve
16 Driver
17 Receiving sleeve
18 Static ring
19 Helical spring
20 Stop sleeve
21 Sliding sleeve
22 Supporting ring
23 Bearing sleeve
24 Clamping ring
25 Slot
26 Collar The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A commercial vehicle disc brake for use with a brake disc, the disc brake being mountable on a stationary brake carrier, the disc brake comprising:
    a sliding caliper that straddles the brake disc in use;
    two brake pads arranged in the caliper, the brake pads being moveable in opposite directions in order to contact the brake disc in braking operations;
    at least one fastening element having a guide spar, the fastening element being operatively configured for fastening the caliper to the stationary brake carrier;
    a brake application device having at least one adjusting spindle, the brake application device being operable to press the one of the two brake pads on an action-side of the disc brake facing the brake application device against the brake disc;
    an adjusting device by way of which a wear-induced change in an air play between the brake pads and the brake disc is compensatable;
    a restoring device operatively arranged on the action-side of the disc brake, the restoring device including a restoring element, the restoring device being operable to automatically bring the caliper into an initial position counter to a displacement direction during brake application;
    wherein the restoring device includes a supporting part, the supporting part being operatively configured to remain in position with respect to the stationary brake carrier during the braking-induced displacement of the caliper, the supporting part interacting with the restoring element, and
    further wherein the restoring element and the adjusting device are configured such that either the maximum possible moving force of the restoring element is lower than the minimum possible adjusting force of the adjusting device, or the minimum possible moving force of the restoring element is greater than the maximum possible adjusting force of the adjusting device.

2. The disc brake according to claim 1, wherein the supporting part bears against the guide spar with static friction.

3. The disc brake according to claim 2, wherein the static friction is dimensioned such that the supporting part remains in position on the guide spar during a braking operation and is displaceable relative to the guide spar during wear-induced adjustment of the caliper, according to a wear stroke.

4. The disc brake according to claim 1, wherein the supporting part comprises a plurality of supporting lips arranged parallel to and at a spacing from one another, the supporting lips being arranged about a circumference of the guide spar and being deformed elastically in a displacement direction of the caliper, the supporting lips engaging indirectly or directly into the caliper.

5. The disc brake according to claim 4, wherein the supporting lips comprise an elastomer material.

6. The disc brake according to claim 4, wherein the restoring element is a sleeve-shaped driver connected to the caliper, and the supporting lips engage into grooves of the sleeve-shaped driver.

7. The disc brake according to claim 4, wherein each sealing lip bears against the guide spar with static friction.

8. The disc brake according to claim 4, wherein the supporting lips are formed integrally on a support sleeve that bears against the guide spar with static friction.

9. The disc brake according to claim 1, wherein the supporting part comprises a receiving sleeve and a static ring embedded in the receiving sleeve and bearing against the guide spar with static friction; and
wherein the restoring element is a helical spring bearing against an end side of the receiving sleeve, the helical spring being guided concentrically on the guide spar and being supported on an opposite side on the caliper or a part connected to the caliper.

10. The disc brake according to claim 9, wherein the caliper is operatively mounted to slide with respect to the receiving sleeve.

11. The disc brake according to claim 9, wherein the helical spring is guided on a stop sleeve connected to the caliper, wherein, in a non-operational position of the disc brake, the stop sleeve is arranged at a spacing from the receiving sleeve by way of a stop edge.

12. The disc brake according to claim 11, wherein, in the non-operational position of the disc brake, the spacing between the stop sleeve and the receiving sleeve corresponds to a reaction-side air play.

13. The disc brake according to claim 1, wherein the supporting part comprises one or more clamping rings, each bearing against the guide spar with static friction.

14. The disc brake according to claim 13, wherein the one or more clamping rings is a plurality of clamping rings that are packed together and bear against the guide spar with static friction.

15. The disc brake according to claim 13, wherein each clamping ring has a longitudinal slot.

16. The disc brake according to claim 1, wherein on a side lying opposite the restoring element, the supporting part is supported on a shoulder of a stepped bore of the caliper in a non-use position of the disc brake.

\* \* \* \* \*